United States Patent
Finn et al.

(10) Patent No.: US 8,001,161 B2
(45) Date of Patent: Aug. 16, 2011

(54) CLONING OBJECTS IN A VIRTUAL UNIVERSE

(75) Inventors: Peter George Finn, Brampton (CA); Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 12/109,023

(22) Filed: Apr. 24, 2008

(65) Prior Publication Data

US 2009/0327219 A1  Dec. 31, 2009

(51) Int. Cl.
  *G06F 7/00* (2006.01)
  *G06F 17/30* (2006.01)
  *G06F 15/16* (2006.01)
(52) U.S. Cl. .......... 707/803; 707/914
(58) Field of Classification Search .......... 707/803, 707/802, 914
  See application file for complete search history.

(56) References Cited

U.S. PATENT DOCUMENTS

| | | | |
|---|---|---|---|
| 6,421,047 B1 * | 7/2002 | de Groot | 345/419 |
| 6,798,407 B1 | 9/2004 | Benman | |
| 7,805,680 B2 | 9/2010 | Meyers et al. | |
| 2002/0169644 A1 * | 11/2002 | Greene | 705/7 |
| 2003/0004774 A1 | 1/2003 | Greene et al. | |
| 2004/0053690 A1 * | 3/2004 | Fogel et al. | 463/42 |
| 2004/0166935 A1 | 8/2004 | Gavin et al. | |
| 2005/0071306 A1 | 3/2005 | Kruszewski et al. | |
| 2006/0194632 A1 | 8/2006 | Hendrickson et al. | |
| 2006/0195462 A1 * | 8/2006 | Rogers | 707/100 |
| 2006/0258462 A1 * | 11/2006 | Cheng et al. | 463/42 |
| 2007/0247979 A1 | 10/2007 | Brillon et al. | |
| 2008/0252716 A1 | 10/2008 | Kano et al. | |
| 2008/0281622 A1 | 11/2008 | Hoal | |
| 2009/0089157 A1 | 4/2009 | Narayanan | |
| 2009/0254417 A1 * | 10/2009 | Beilby et al. | 705/10 |
| 2009/0299960 A1 | 12/2009 | Lineberger et al. | |
| 2010/0205179 A1 * | 8/2010 | Carson et al. | 707/802 |

OTHER PUBLICATIONS

U.S. Appl. No. 12/108,925, filed Apr. 24, 2008, Finn et al.
U.S. Appl. No. 12/108,968, filed Apr. 24, 2008, Finn et al.
U.S. Appl. No. 12/108,987, filed Apr. 24, 2008, Finn et al.
U.S. Appl. No. 12/109,010, filed Apr. 24, 2008, Finn et al.
U.S. Appl. No. 12/165,922, filed Jul. 1, 2008, Finn et al.
U.S. Appl. No. 12/109,040, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.

(Continued)

*Primary Examiner* — Tony Mahmoudi
*Assistant Examiner* — Brian E Weinrich
(74) *Attorney, Agent, or Firm* — Mark C. Vallone; Yee & Associates, P.C.

(57) ABSTRACT

In one embodiment, the process obtains avatar tracking data that identifies a location of an avatar in relation to a range of an object. The range includes a viewable field. In response to the location of the avatar being within the range of the object, the process queries a data structure storing cloning data for a record of a clone of the object. Thereafter, the process instantiates the clone of the object in response to the presence of the record of the clone of the object in the data structure. The process then invokes a set of object methods associated with the record of the clone in the data structure.

16 Claims, 10 Drawing Sheets

OTHER PUBLICATIONS

USPTO Office Action for U.S. Appl. No. 12/109,040 dated Feb. 3, 2011.

USPTO office action for U.S. Appl. No. 12/168,657, dated Apr. 26, 2011.

* cited by examiner

CLONING OBJECTS IN A VIRTUAL UNIVERSE

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for cloning an object for presentation to a set of avatars.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest™, Ultima Online™, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the user of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

The viewable field is the field of view for a particular user. The viewable field for a particular user may include objects, as well as avatars belonging to other users. The viewable field is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. An object is an element in a virtual universe that does not represent a user. An object may be, for example, buildings, statues, billboards, signs, and advertisements in the virtual universe. However, objects in a particular user's viewable field may be difficult or impossible to read because of the manner in which the object is presented to one or more users. For example, words on a sign posted in a virtual universe may be too large to read. Alternatively, letters or words on a sign may overlap, making it difficult to comprehend the message on the sign. Further, modifications to an object to facilitate viewing by one avatar may render that object impossible to read by another avatar.

SUMMARY OF THE INVENTION

In one embodiment, the process obtains avatar tracking data that identifies a location of an avatar in relation to a range of an object. The range includes a viewable field. In response to the location of the avatar being within the range of the object, the process queries a data structure storing cloning data for a record of a clone of the object. Thereafter, the process instantiates the clone of the object in response to the presence of the record of the clone of the object in the data structure. The process then invokes a set of object methods associated with the record of the clone in the data structure.

DETAILED DESCRIPTION OF THE PREFERRED EMBODIMENT

Figure 1:
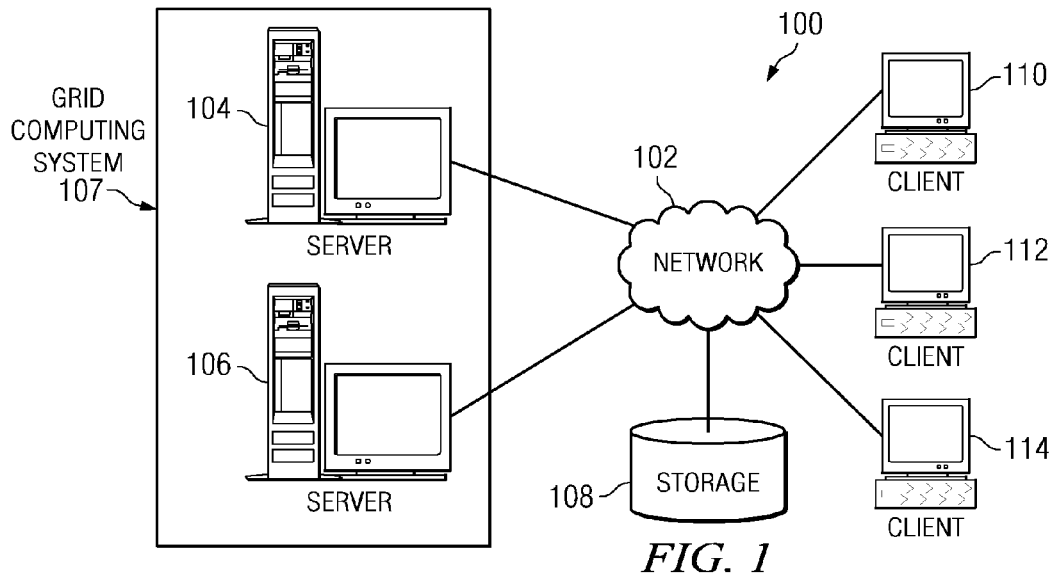
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
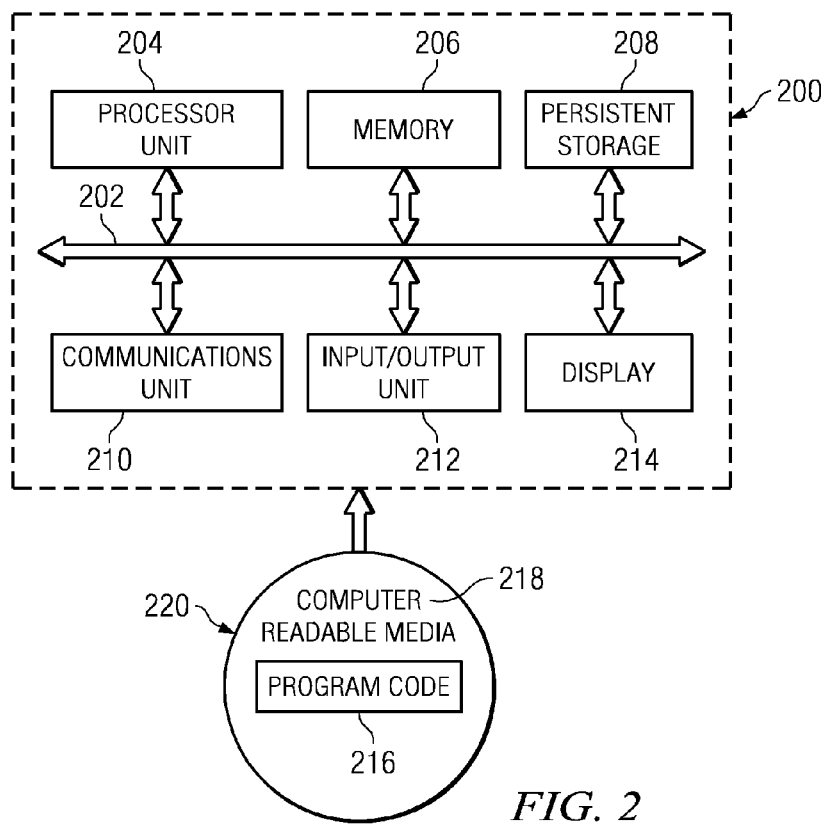
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. In particular, servers 104 and 106 form grid computing system 107. Grid computing system 107 is a system formed from two or more data processing systems for rendering and managing a virtual universe. Users of the virtual universe have agents on servers 104 and 106. An agent is a user's account. A user uses an agent to build an avatar representing the user. The agent is tied to the inventory of assets or possessions the user owns in the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. A region is a virtual area of land within the virtual universe. A region typically resides on a single server, such as server 104. In a virtual universe, assets, avatars, the environment, and anything visual consists of universally unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics to represent various objects, such as landscapes, the sky, animals, vehicles, buildings, and other graphical objects.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. The illustrative embodiments recognize that current virtual universe systems do not enable the cloning of objects for improving visibility of those objects.

The illustrative embodiments provide a computer implemented method, apparatus, and computer program product for cloning objects. In one embodiment, the process obtains tracking data that identifies a location of an avatar in relation to a range of an object. The avatar tracking data is obtained from at least one of an object avatar rendering table and an object based avatar tracking controller. In other words, the tracking data may be obtained from either the avatar rendering table, the object based avatar tracking controller, or both. However, in other embodiments, the avatar tracking data may be obtained from any other source.

The range includes a viewable field. In response to the location of the avatar being within the range of the object, the process queries an object clone control table for a record of a clone of the object in the object clone control table. A clone is an instance of an object that may be presented to the avatar for viewing. Thus, rather than presenting a single object to a set of avatars having different vantage points, cloning objects enables the presentation of an instance of an object to each avatar of the set of avatars. The cloning of objects makes it possible to present a clone of an object to each avatar in the viewable area of the object to increase the visibility of the object.

The process instantiates the clone of the object in response to the presence of the record of the clone of the object in the object clone control table. Further, each object clone is modified according to a set of methods that increases the visibility of that object clone to a selected avatar.

A range may include a detection area in addition to the viewable field. At least one of querying of the object clone control table and instantiating a clone may occur when the avatar enters the detection area. Thus, when the avatar enters the detection area, the process may either query the object clone control table, instantiate a clone, or both.

After obtaining the tracking data for an avatar, the process invokes a set of object methods associated with the record of the clone of the object in the object clone control table. As used herein, the term "set" refers to one or more. Thus, a set of object methods includes one or more object methods.

Figure 3:
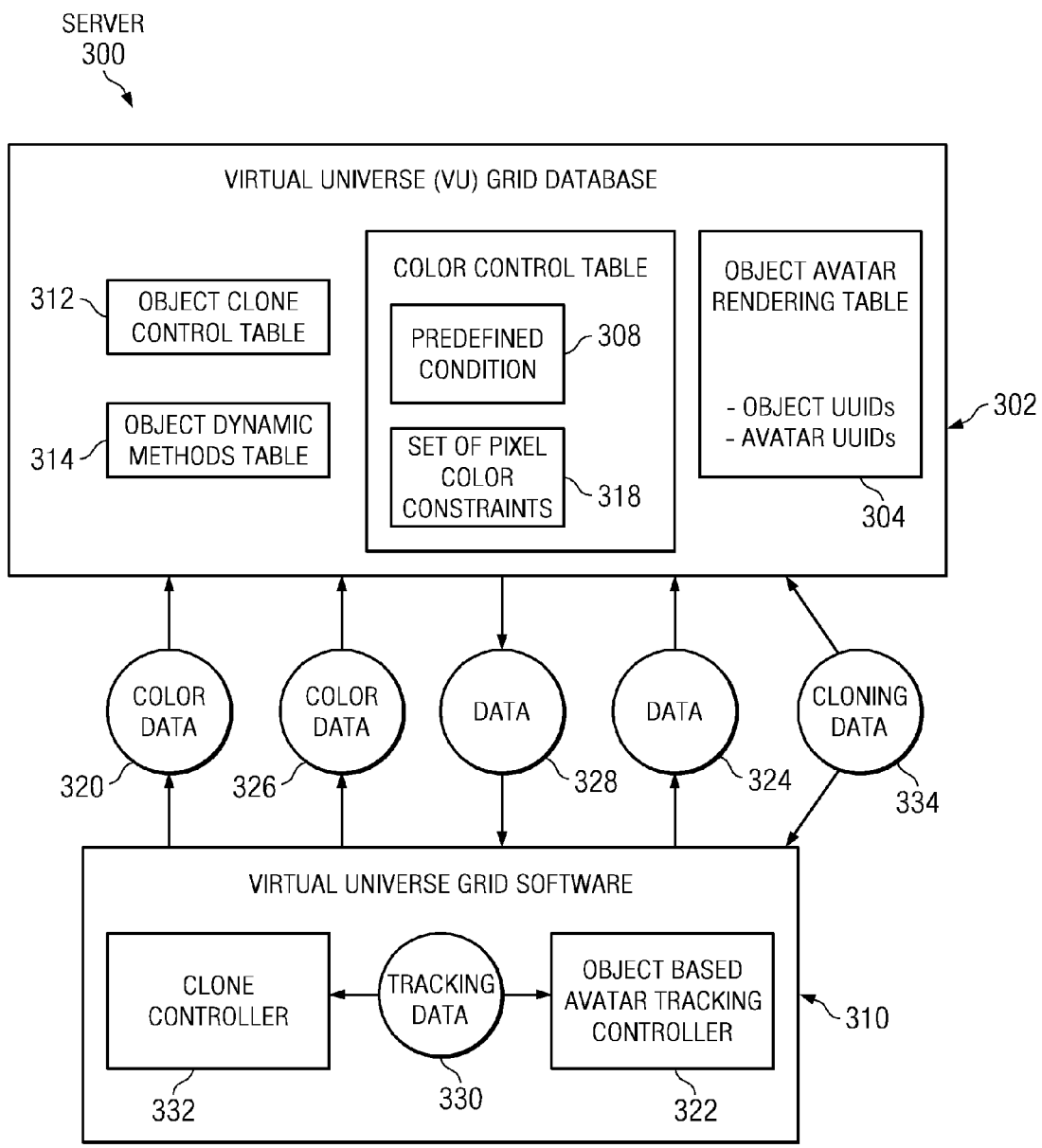
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. Server 300 may be a single, stand alone server, or server 300 may be a server in a virtual universe grid computing system or in a cluster of two or more servers. In this example, server 300 is a server such as server 104 in FIG. 1, which is a part of a grid computing system, such as grid computing system 107 in FIG. 1. The grid computing system is operable to render and manage a virtual universe.

Virtual universe grid database 302 is a database on the grid computing system for storing data used by virtual universe grid software 304 to render and manage the virtual universe. Virtual universe grid database 302 includes object avatar rendering (OAR) table 306. Object avatar rendering table 306 is a table that stores object unique identifiers and avatar unique identifiers.

In a virtual universe, assets, avatars, the environment, and anything visual consists of universally unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 306 stores a universally unique identifier (UUID) for each selected object in the virtual universe. Object avatar rendering table 306 also stores unique identifiers and other data describing avatars within a viewable field of the object or within a selected zone associated with the object. For example, if the selected objects include object A and object B, then object avatar rendering table 306 stores object A unique identifier, unique identifiers and other data for all avatars within the viewable field of object A, unique identifiers for object B, and unique identifiers and other data for all avatars within the viewable field of object B.

Virtual universe grid database 302 also includes object clone control table 308. Object clone control table 308 is a table storing record 309. Record 309 is a record of a clone that includes, among other things, object unique identifiers, avatar unique identifiers, and instance unique identifiers. Instance unique identifiers are unique identifiers assigned to each clone that is created in a virtual environment. Instance unique identifiers allow methods to identify and modify the various clones that exist in a virtual universe.

Object dynamic methods table 310 is a table storing the methods that may be applied to clones identified in object clone control table 308. In addition, object dynamic methods table 310 may associate each method with priority logic. The priority logic may be used for determining the order in which methods may be executed in the event that an object is subject to modification by more than one method.

Object based avatar tracking controller 312 stores data 314 in object avatar rendering table 306. Data 314 includes the unique identifiers and other data describing avatars within the viewable field of the selected objects. When object based avatar tracking controller 312 needs data from object avatar rendering table 306 for initiating or implementing geometric and texture modifications in the virtual universe, object based avatar tracking controller 312 sends query 316 to object avatar rendering table 306. In response to query 316, virtual universe grid database 302 sends data 318 to virtual universe grid software 304 for utilization by object based avatar tracking controller 312 to track avatars and implement modifications of the selected objects to improve the position and appearance of the selected objects within the virtual universe and enable improved visibility of the selected objects.

Clone controller 320 is software for generating clones of objects within a virtual universe. Clone controller 320 may generate a clone of an object for each avatar in a particular range of an object. A range of an object is an area proximate to an object and may include one or more sub regions. For example, a range of an object includes a viewable field and a detection area, as is depicted in regard to object 502 in FIG. 5.

Clone controller 320 initiates the process of generating clones when the location of an avatar is within a range of an object. Clone controller may determine that the avatar's location is in the range of an object by obtaining tracking data 322. Tracking data 322 is data that identifies a location of an avatar in relation to a range of an object. In this example, clone controller 320 obtains tracking data 322 from object based avatar tracking controller 312 as tracking data 322 is generated. However, in an alternate embodiment, clone controller 320 may obtain tracking data 322 from object avatar rendering table 306. In yet another embodiment, clone controller 320 may obtain tracking data 322 from any other source.

Each clone that is generated may be rendered according to a different object method. For example, an object method may illuminate a portion of the object, enhance the size of an object, change the color of an object, or remove the effect of another method that otherwise obscures the object. For clone controller 320 to keep track of the various clones and object methods, clone controller 320 stores cloning data 324 into object clone control table 308. Cloning data 324 is data that includes the unique identifiers of objects, avatars, and clones. Clone controller 320 may also reference cloning data 324 stored in object clone control table 308 for identifying and invoking a set of object methods that may be rendered with respect to each clone.

The clones may be used to improve the visibility of the object from which the clone was derived. The improved visibility results from the invocation of different object methods that may modify the clone of the object in a different, optimal manner. For example, two avatars may approach an object from different angles. The first avatar may approach the object from a more distant location directly in front of the object. The second avatar may approach the object from a closer location, but from an angle. The first avatar may be unable to clearly see the object because of its greater distance from the object. The second avatar may be unable to clearly see the object because a glare from a nearby light source obscures the object.

Two object methods may exist for modifying the object for increasing the object's visibility to avatars in a virtual universe. The first object method may enlarge the object, thereby making it easier for the first avatar to see. However, the glare from the nearby light source may still obscure the object from the second avatar. Furthermore, enlarging the object may actually prevent the second avatar from viewing the object in its entirety because of the second avatar's close proximity to the object.

The second object method may reduce glare, thereby allowing the second avatar to clearly see the object. However, the distance of the first avatar may prevent the first avatar from clearly seeing the object.

Consequently, each avatar may be presented with a separate clone of the object. The clone presented to the first avatar would be modified using the object method to enlarge the clone of the object. The second avatar may be presented with a clone of the object modified by the object method for reducing glare. Thus, each avatar may be presented with a clone of the object modified using an object method that accommodates unique viewing conditions.

Virtual universe grid software 304 is software for rendering the virtual universe. Virtual universe grid software 304 includes object based avatar tracking controller 312. Object based avatar tracking controller 312 is software for tracking avatars within the viewable field of each selected object.

Figure 4:
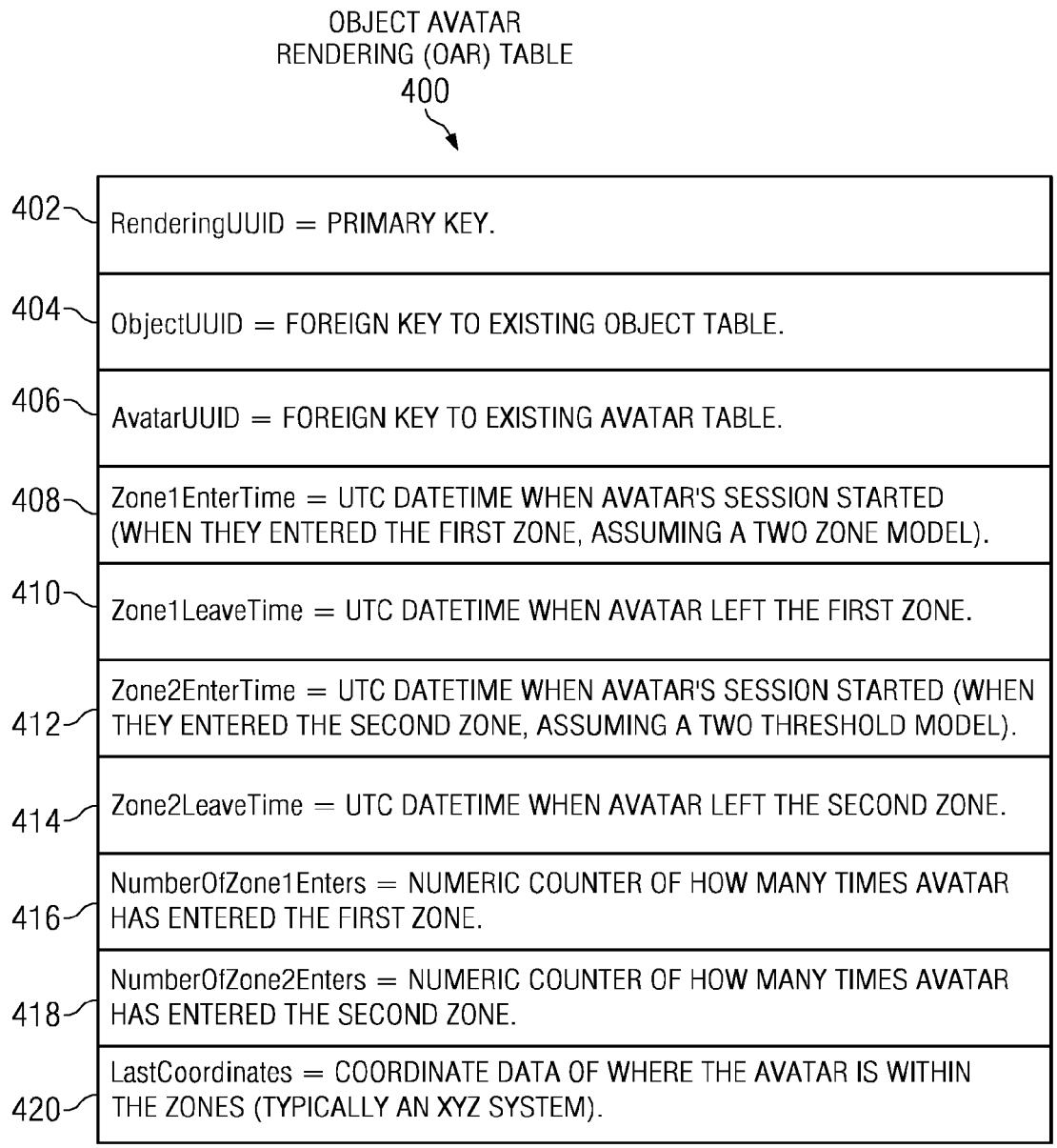
FIG. 4 is a block diagram of an object avatar rendering table in accordance with an illustrative embodiment.

FIG. 4 is a block diagram of an object avatar rendering table in accordance with an illustrative embodiment. Object avatar rendering table 400 is an example of data in an object avatar rendering table, such as object avatar rendering table 306 in FIG. 3.

RenderingUUID 402 is a primary key for object avatar rendering table 400. ObjectUUID 404 is a unique identifier for a selected object in a virtual universe. ObjectUUID 404 is a foreign key to the existing object table. AvatarUUID 406 is a foreign key to the existing avatar table. AvatarUUID 406 includes a unique identifier for each avatar in the viewable field of the object associated with ObjectUUID 404.

Zone1EnterTime 408 is a field of a date and/or time when an avatar enters a first zone within the viewable field of an object. Zone1LeaveTime 410 is a field for a date and/or time when the avatar leaves the first zone. Zone2EnterTime 412 is a field in object avatar rendering table 400 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 414 is a field for storing the date and/or time when a given avatar leaves the second zone. NumberofZone1Enters 416 is a field for storing the number of times a particular avatar has entered the first zone. This information may be useful to determine whether a user operating the particular avatar has never viewed the object. If the user has never viewed the object, then the content associated with an object should be displayed in full to the user associated with the avatar. The information in NumberofZone1Enters 416 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 418 is a field for storing the number of times an avatar has entered the second zone. LastCoordinates 420 is a field for storing the coordinate data describing where a given avatar is within the first zone or the second zone of a selected object. The coordinate data is typically given in xyz type coordinate data.

Figure 5:
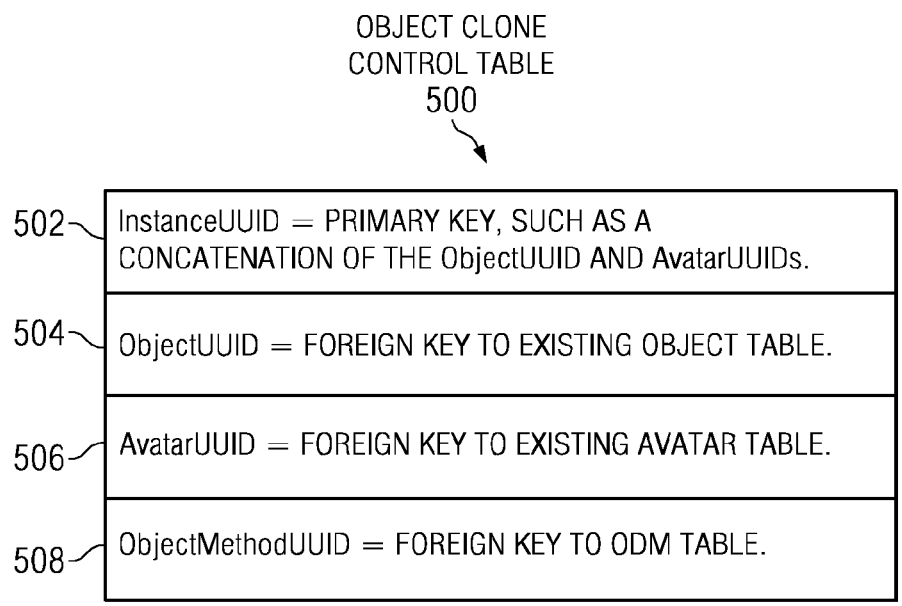
FIG. 5 is a block diagram of an object movement control table in accordance with an illustrative embodiment.

FIG. 5 is a block diagram of an object movement control table in accordance with an illustrative embodiment. Object clone control table 500 is an example of data that is included in a record stored in an object clone control table, such as object clone control table 308 in FIG. 3.

InstanceUUID 502 is a primary key for object clone control table 500. In one embodiment, InstanceUUID 502 is a concatenation of avatar and object UUIDs.

ObjectUUID 504 is a unique identifier for a selected object in a virtual universe. ObjectUUID 504 is a foreign key to the existing object table. AvatarUUID 506 is a foreign key to the existing avatar table. AvatarUUID 506 includes a unique identifier for each avatar in the viewable field of the object associated with object UUID 504. ObjectMethodUUID 508 is a foreign key linking to an object dynamic methods table, such as object dynamic methods table 600 in FIG. 6.

Figure 6:
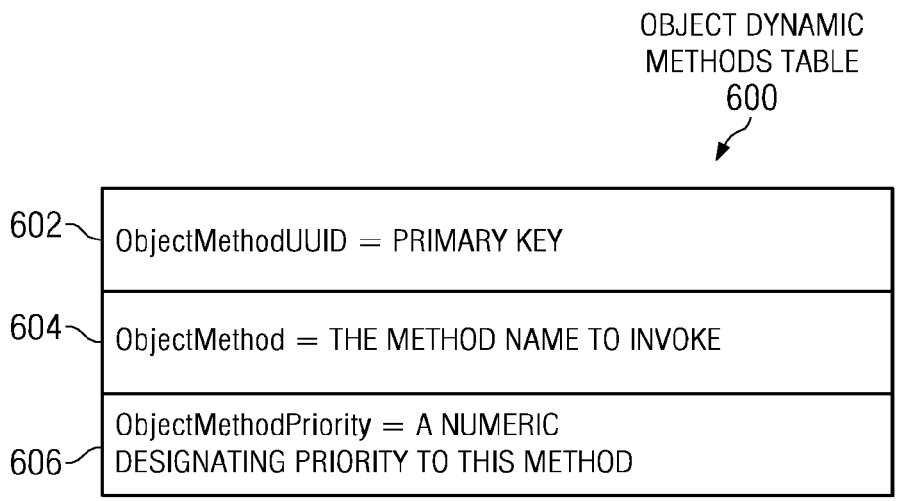
FIG. 6 is a block diagram of an object dynamic methods table in accordance with an illustrative embodiment.

FIG. 6 is a block diagram of an object dynamic methods table in accordance with an illustrative embodiment. Object clone control table 500 is an example of data in an object clone control table, such as object clone control table 308 in FIG. 3.

ObjectMethodUUID 602 is a primary key for object dynamic methods table 600. ObjectMethodUUID 602 is related to ObjectMethodUUID 508 in FIG. 5 for identifying the method(s) that may be invoked with respect to a clone identified by InstanceUUID 502 in FIG. 5.

ObjectMethod 604 is a field of data storing the name of the method that may be invoked for application to an object. ObjectMethod 604 may include one or more methods that may be invoked for application to an object. The order in which the methods are to be invoked is determined according to priority logic. In one embodiment, the priority logic specifies that methods are invoked in accordance with a relative priority ranking. The rankings may be stored in ObjectMethodPriority 606.

ObjectMethodPriority 606 is a field storing a numeric designating the priority in which methods of object methods table 600 may be invoked. For example, in the event that multiple methods are queried for an object, or a clone of the object, the numeric in ObjectMethodPriority 606 may be referenced to determine the order in which the methods are to be invoked.

In an illustrative embodiment, object clone control table 500 and object dynamic methods table 600 are linked by an ObjectMethodUUID field, such as ObjectMethodUUID 508 in FIG. 5 and ObjectMethodUUID 606 in FIG. 6. The linking of object clone control table 500 and object dynamic methods table 600 enables a clone controller, such as clone controller 320 in FIG. 3, to determine whether a clone of an object exists. For example, the clone controller may determine that a clone of an object exists if there exists in an object clone control table an InstanceUUID identifying a clone of the object. In one embodiment, this determination may be initiated when an avatar enters a detection area of an object.

The entrance of an avatar into the detection area of an object may also cause a clone controller to instantiate a set of object clones. Thus, an avatar may be presented with two clones for an object. The first clone may be of an object located at a fixed point. The second clone may be of an object that remains in the field of view of the avatar regardless of the direction in which the avatar is facing.

Further, the clone controller may use linked object clone control table 500 and object dynamic methods table 600 to invoke a set of object methods associated with the clone identified by the unique InstanceUUID. In one embodiment, the set of methods may be invoked when an avatar enters a viewable area of an object. Viewable areas are discussed in more detail in FIG. 7.

Figure 7:
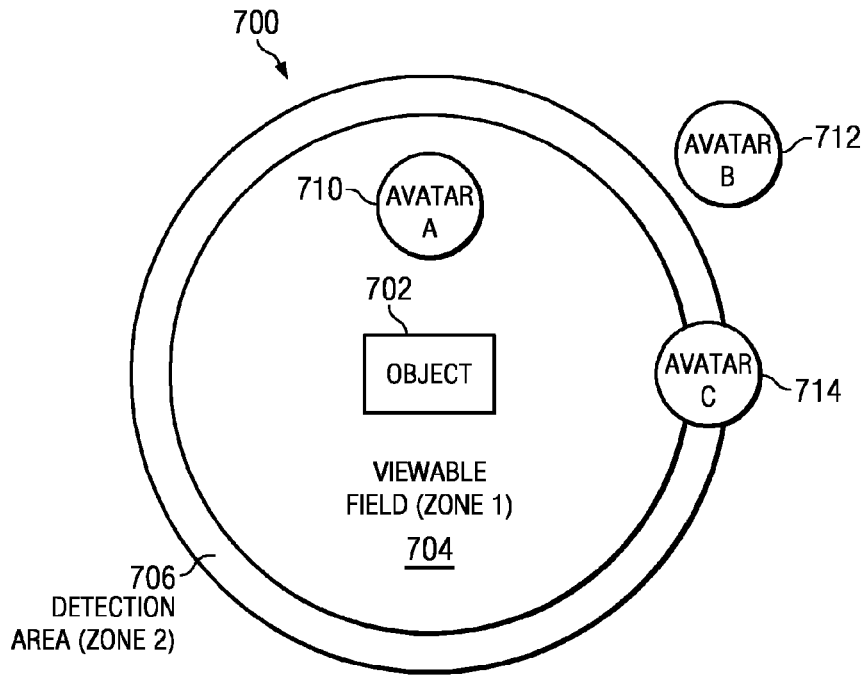
FIG. 7 is a block diagram of a viewable area for an object in accordance with an illustrative embodiment.

FIG. 7 is a block diagram of a viewable area for an object in accordance with an illustrative embodiment. Range 700 is defined with respect to object 702. Object 702 is an element in a virtual universe that is not directly controlled by a user or associated with a user's account. An object may be, for example, buildings, statues, billboards, signs, and advertisements in the virtual universe. In this example, object 702 is an advertisement, such as a billboard or a sign. Range 700 is an area associated with the viewing of object 702. Range 700 includes viewable field 704 and detection area 706 associated with object 702 in a virtual universe.

Viewable field 704 is an area in a given proximity of object 702. Viewable field 704 has a focal point or center at a location that is the same as the location of object 702. Viewable field 704 may also be referred to as zone 1 or a first zone. An avatar in viewable field 704 is able to see or view object 702 and/or content associated with object 702. For example, object 702 may be associated with video and/or audio content. Object 702 may have some movement associated with the object. For example, object 702 may be capable of some limited movement or animation. However, object 702 is substantially limited to a single location in the virtual universe.

Detection area 706 is an area adjacent to viewable field 704 within range 700. Detection area 706 may also be referred to as a second zone or zone 2. An avatar in detection area 706 cannot see object 702 or view content associated with object 702. However, when an avatar enters detection area 706, the object avatar tracking controller software can begin preparing to display object 702 and content associated with object 702 to the avatar when the avatar enters viewable field 704.

In this example, avatar 710 is within viewable field 704. Therefore, avatar 710 is able to view or see object 702. Avatar 712 is not able to see or view object 702. In addition, avatar 712 is not close enough to viewable field 704 to indicate that avatar 712 may be preparing to enter viewable field 704. Avatar C 714 is within detection area 706. Avatar C 714 is not able to see or view object 702.

However, the presence of avatar C 714 indicates that avatar C 714 may be about to enter viewable field 704 or that avatar C 714 has just left viewable field 704. Avatar 712 is outside range 700. Therefore, an object avatar tracking table for object 702 includes entries for avatar 710 in zone 1 and avatar C 714 in zone 2. However, the object avatar tracking table will not include data or records for avatar 712 because avatar 712 is outside both viewable field 704 and detection area 706.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 8:
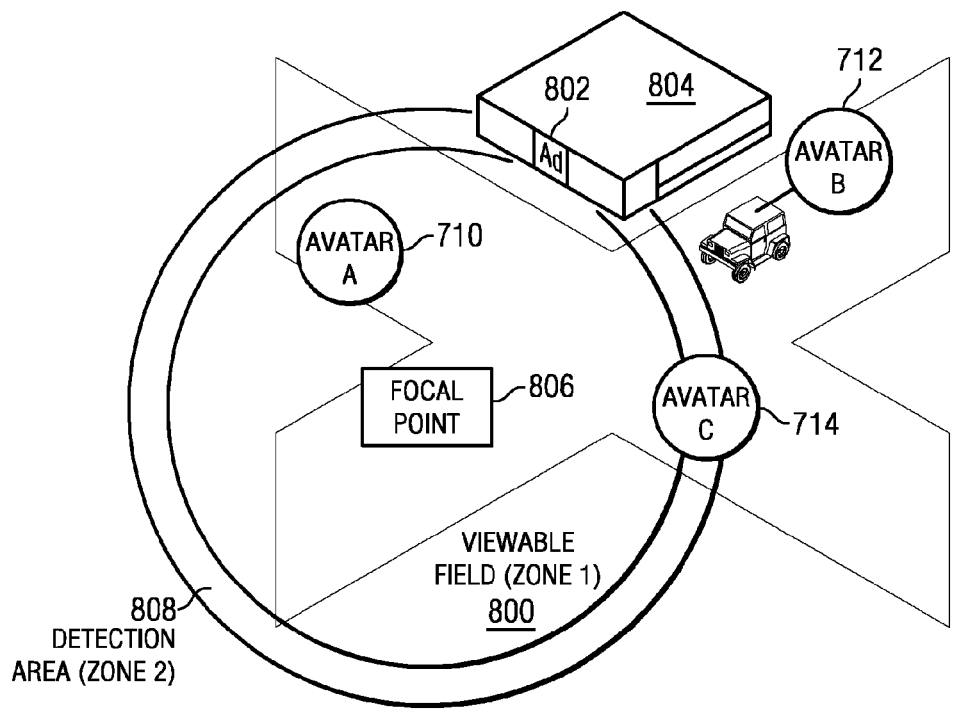
FIG. 8 is a block diagram of a viewable area for an object having a focal point at a location other then the location of the object in accordance with an illustrative embodiment.

FIG. 8 is a block diagram of a viewable area for an object having a focal point at a location other than the location of the object in accordance with an illustrative embodiment. Viewable field 800 is a viewable field for object 802. In this example, object 802 is an advertisement in front of object 804. Viewable field 800 is a range in which an avatar, such as avatar A 710, avatar B 712, and avatar C 714 can see object 802.

Viewable field 800 has focal point 806. Focal point 806 is a point from which the range, or area, of viewable field 800 for an object is determined. In other words, viewable field 800 is an area that is identified based on a predetermined radius or distance from focal point 806. Here, focal point 806 is a location that is different than the location of object 802 because object 802 is adjacent to an obstructing object, such as object 804.

In this example, when avatar C 714 comes in range of detection area 808 of object 802, object based avatar tracking controller, such as object based avatar tracking controller 312 in FIG. 3, makes a determination as to whether there is an existing session associated with the unique identifier of object 802 and the unique identifier of avatar C 714. This step may be implemented by making a query to the object avatar rendering table to determine if avatar C 714 has ever entered zone 2 or zone 1 previously. If there is not an existing session for avatar C 714, the object based avatar tracking controller creates a record in the object avatar rendering table with the unique identifier of object 802 and the unique identifier of avatar C 714.

The record in the object avatar rendering table may optionally include additional information, such as, without limitation, a date and time when avatar C 714 entered zone 2, a date and time when avatar C 714 leaves zone 2, a date and time when avatar C 714 enters zone 1, a number of zone 2 enters, a number of zone 1 enters, coordinates of avatar C 714, and any other data describing avatar C 714. This data is used by the virtual universe grid software for analysis, reporting, and billing purposes.

Object 802 may have an initiation process associated with object 802. For example, if object 802 is an advertisement with an audio and video content associated with viewing object 802, an initiation process may include buffering the audio and/or video content, checking a cache for the audio and/or video content, caching the audio and/or video content, or any other initiation process. In another embodiment, the initiation process may include sending messages to a clone controller, such as clone controller 320 in FIG. 3. The message may notify the clone controller to retrieve tracking data, such as tracking data 322 in FIG. 3, because an avatar is in range of object 802. In addition, the initiation process may include querying databases to determine the existence of clones of object 802.

When avatar C 714 enters viewable field 800, an object based avatar tracking controller may trigger any object initiation process defined by object 802. For example, when avatar C 714 enters viewable field (zone 1) 800, the object based avatar tracking controller may display the buffered or cached content. If a user is viewing the object for the first time and object 802 has a video or audio file associated with viewing the object, the process starts playing the video or audio from the beginning.

In another embodiment, a clone controller, such as clone controller 320 in FIG. 3, may query an object clone control table, such as object clone control table 500 in FIG. 5, and/or instantiate a clone of object 802 when avatar C 714 enters detection area 808. Thereafter, when avatar C 714 enters viewable field 800, clone controller 320 may invoke a set of methods associated with the object clone of object 802 for presentation to avatar C 714.

If a session already exists, the object based avatar tracking controller triggers any object re-initiation process defined by the object. For example, if the user is not viewing an object with an associated video for the first time, the process starts playing the video at a point in the video after the beginning to avoid replaying introductory material. This point may be, for example, immediately after an introduction, in a middle part, or near the end of the video.

The object based avatar tracking controller makes a determination as to whether the position of avatar C 714 has changed. Changing position, in these examples, may include traveling, turning, walking, or disappearing, such as teleporting, logging off, or disconnecting. When the position of avatar C 514 changes, the object based avatar tracking controller adds the user position data to the object avatar rendering table, such as at a field for last coordinates 420 in FIG. 4. The user position data includes angle of view coordinate data of the avatar relative to object 802 and the distance of avatar C 714 to object 802.

A clone controller, such as clone controller 320 in FIG. 3 may then modify object 802 according to a set of methods stored in an object dynamic methods table, such as object dynamic methods table 600 in FIG. 6. Modifications may be made by invoking an object method that is selected, in part, upon user position data. The modification of object 802 is capable of improving the visibility of object 802 to an avatar in viewable field 800.

When avatar C 714 is out of range of viewable field 800 and detection area 808, the object based avatar tracking controller logs a session pause for the session associated with avatar C 714. The log may include the date and time of the session pause. When the session has been paused for an amount of time that exceeds a threshold amount of time, the object based avatar tracking controller terminates the session associated with avatar C 714. The process termination may include, without limitation, removing the records and data associated with avatar C 714 from the object avatar rendering table. If the record is not deleted, when avatar C 714 comes back into range of zone 1 or zone 2 of object 802, the object based avatar tracking controller determines that an existing session associated with the unique identifier of object 802 and a unique identifier of avatar C 714 already exist. In such a case, a new record for avatar C 714 will not be created. Instead, the data in the object based avatar rendering table will be updated with new data regarding avatar C 714 in the range of object 802.

Figure 9:
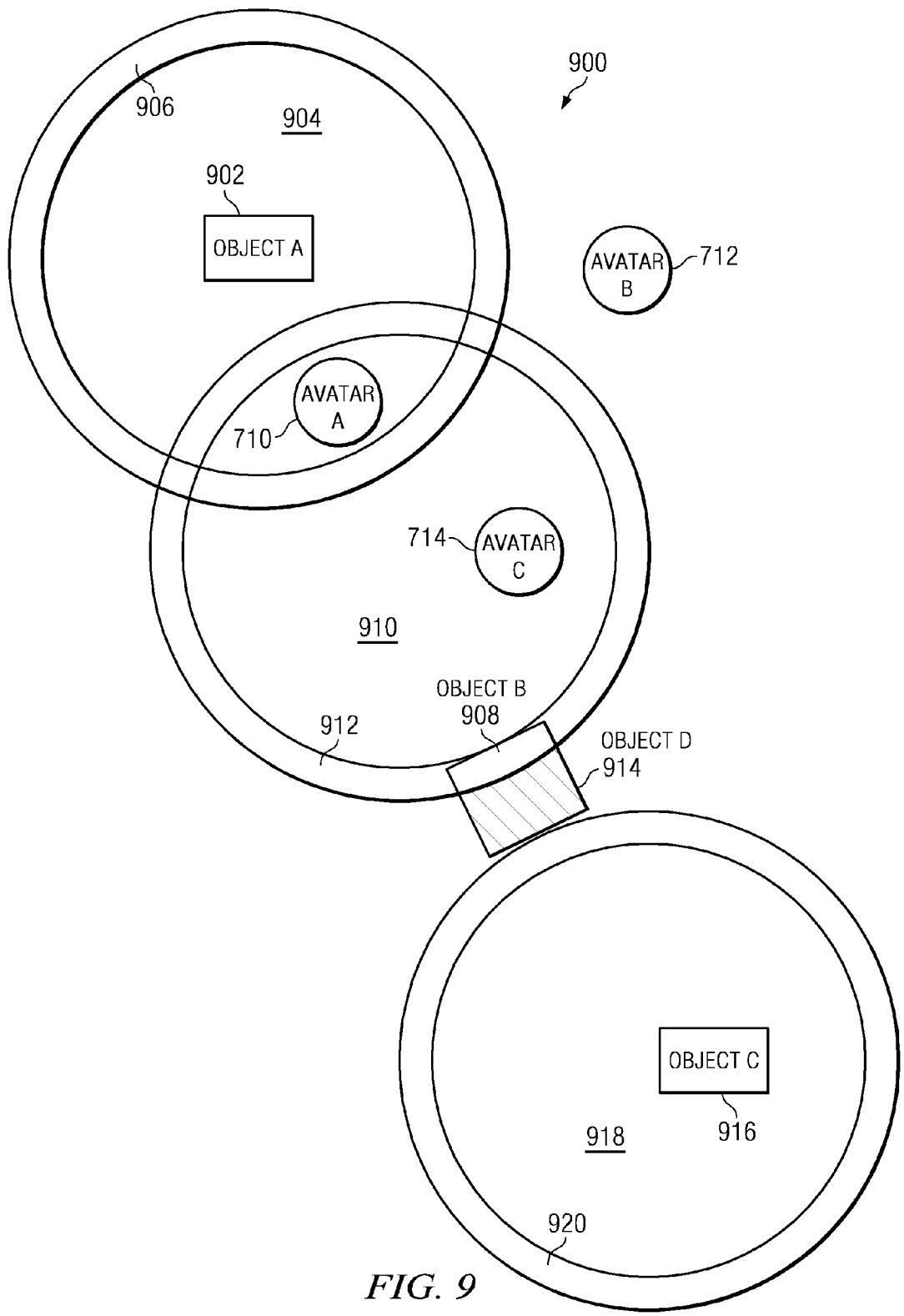
FIG. 9 is a block diagram of viewable areas for a plurality of objects in accordance with an illustrative embodiment.

FIG. 9 is a block diagram of viewable areas for different objects in accordance with an illustrative embodiment. Region 900 is a region in a virtual universe. Region 900 is associated with a server, such as server 104 in FIG. 1. Each region in a virtual universe is typically supported by a different server.

Object 902 is associated with viewable field (zone 1) 904. Object 902 may also optionally have a detection area (zone 2) 906. Viewable field (zone 1) 910 is a viewable area associated with object B 908. Object B 908 may also have detection area (zone 2) 912. In this example, viewable field 910 overlaps in part with a portion of viewable field 904. Object C 716 is associated with viewable field 918. Object C 916 is optionally associated with detection area (zone 2) 920.

In this example, avatar A 922 is within viewable field 904 of object A 902 and viewable field 910 of object B 908. In other words, avatar A 922 can see object A 902 or object B 908. Avatar C 926 is within viewable field 910 of object B 908. Avatar C 926 is able to see or view object B 908. Avatar C 924 is outside the viewable fields of objects 902, 908, 914, and 918.

Figure 10:
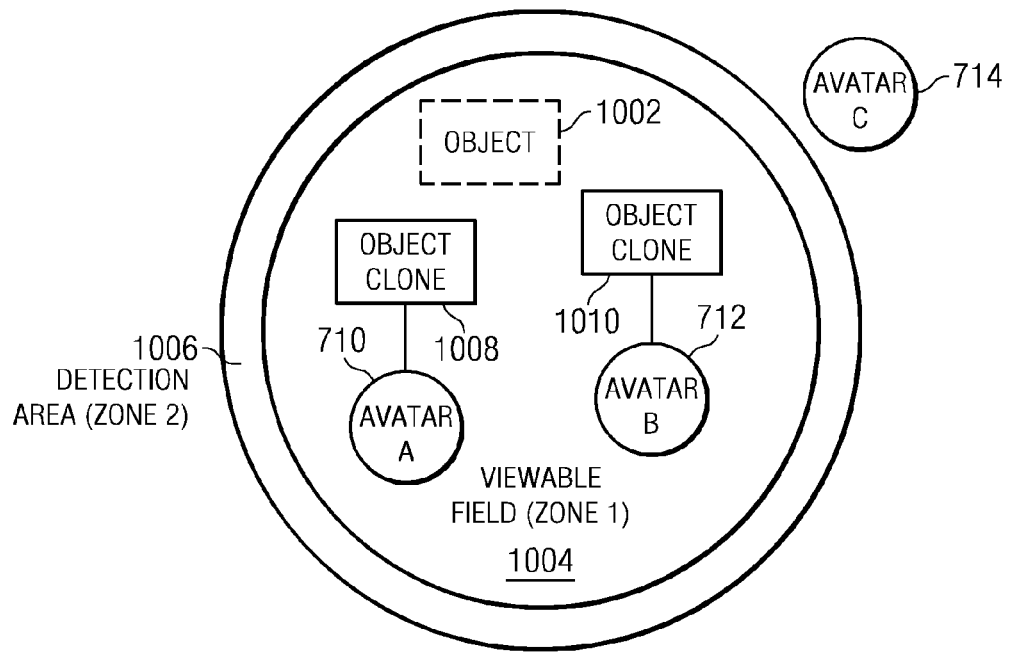
FIG. 10 is a block diagram of an object based avatar table for a plurality of objects in accordance with an illustrative embodiment.

FIG. 10 is a block diagram of a set of clones presented to a set of avatars in accordance with an illustrative embodiment. The set of clones are clones of object 1002.

Object 1002 is associated with a range having viewable field 1004 and detection area 1006. In this example, avatar A 710 and avatar B 712 are located within viewable field 1004. Avatar C 714 is located outside of the range of object 1002.

Because avatar A 710 and avatar B 712 are located within viewable field 1004, avatar A 710 and avatar B 712 are presented with object clone 1008 and object clone 1010, respectively. Object clones 1008 and 1010 are clones of object 1002. Each clone of object 1002 may be rendered differently according to the various methods associated therewith. For example, because avatar A 710 is located further from object 1002, then object clone 1008 may be a clone of object 1002 modified by a geometric and texture modification method that enhances the size of object 1002.

In addition, because avatar B 712 is located closer to object 1002, but at an angle to object 1002, then object clone 1010 may be a clone of object 1002 modified by a geometric and texture modification method that eliminates glare that may reflect from object 1002.

Figure 11:
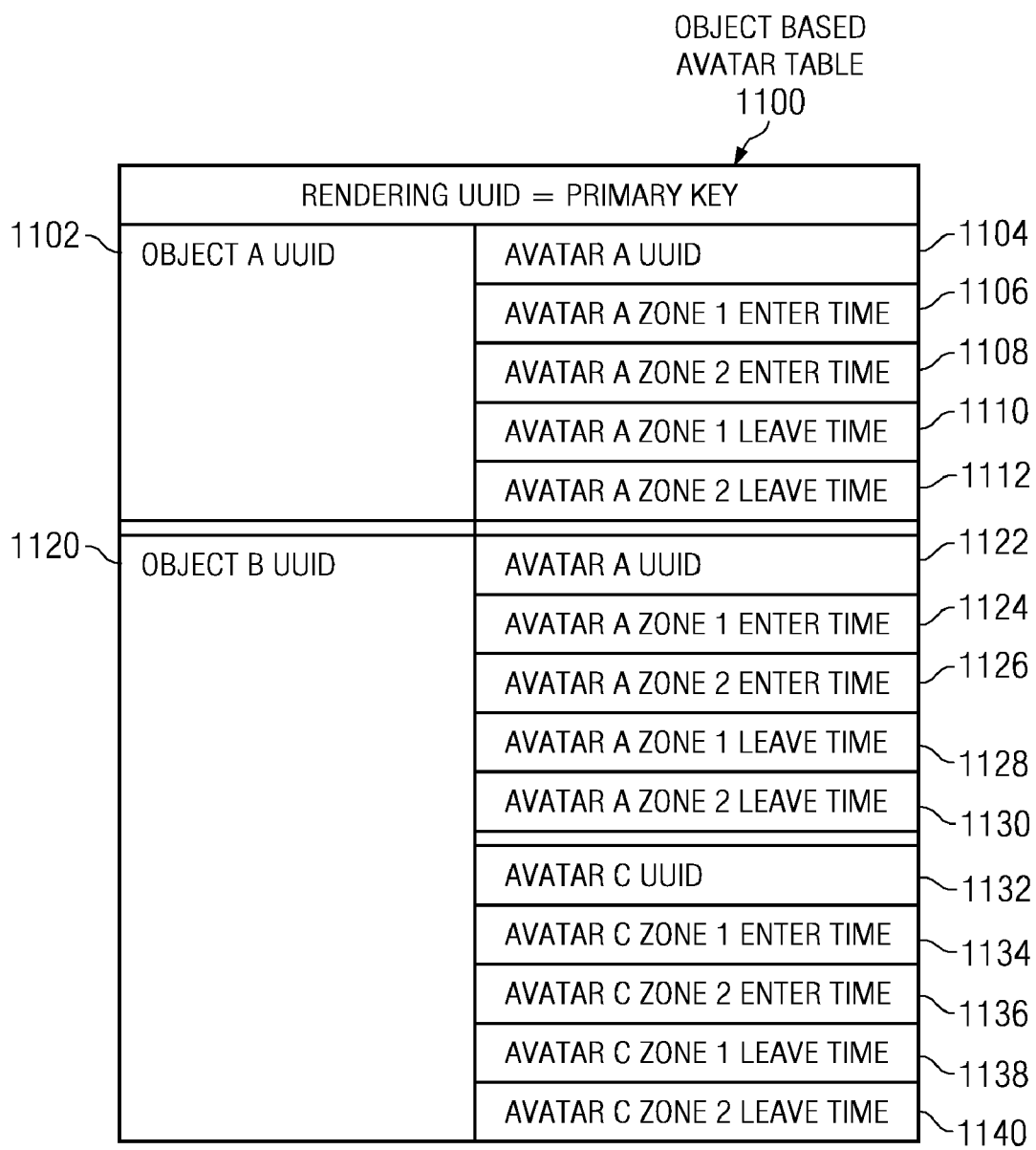
FIG. 11 is a block diagram of a set of clones presented to a set of avatars in accordance with an illustrative embodiment.

FIG. 11 is a block diagram of an object based avatar table for a plurality of objects in accordance with an illustrative embodiment. Object based avatar table 1100 is an object based avatar table for a plurality of selected objects. In this example, object based avatar table 1100 includes a unique identifier for selected object A 1102 and object B 1120. Data describing avatars for each selected object are also included.

For example, object based avatar table 1100 includes avatar A UUID 1104, avatar A zone 1 enter time 1106, avatar A zone 2 enter time 1008, avatar A zone 1 leave time 1110, and avatar A zone 2 leave time 1112. Object based avatar table 1100 includes data regarding avatars associated with zone 1 and zone 2 of object B 1120. For example, and without limitation, object based avatar table 1100 includes avatar A UUID 1122, avatar A zone 1 enter time 1124, avatar A zone 2 enter time 1126, avatar A zone 1 leave time 1128, avatar A zone 2 leave time 1130, avatar C UUID 1032, avatar C zone 1 enter time 1134, avatar C zone 2 enter time 1136, avatar C zone 1 leave time 1138, and avatar C zone 2 leave time 1140.

The fields and data shown in object based avatar table 1100 are only examples of fields and data that may be included in an object based avatar table. However, implementations of object based avatar tables are not limited to only including the data and/or fields shown in FIG. 11. An object based avatar table may include additional data and/or additional fields not shown in FIG. 11.

In addition, object based avatar table 1100 in this example only includes data and fields for two objects and two different avatars. However, an object based avatar table may include fields and/or data for any number of objects and any number of avatars. In other words, object based avatar table 1100 may include fields and/or data for a single object, as well as two or more objects. Likewise, object based avatar table 1100 may include fields and/or data for tracking a single avatar associated with each object, as well as two or more avatars associated with each object's viewable field and/or detection area.

Figure 12:
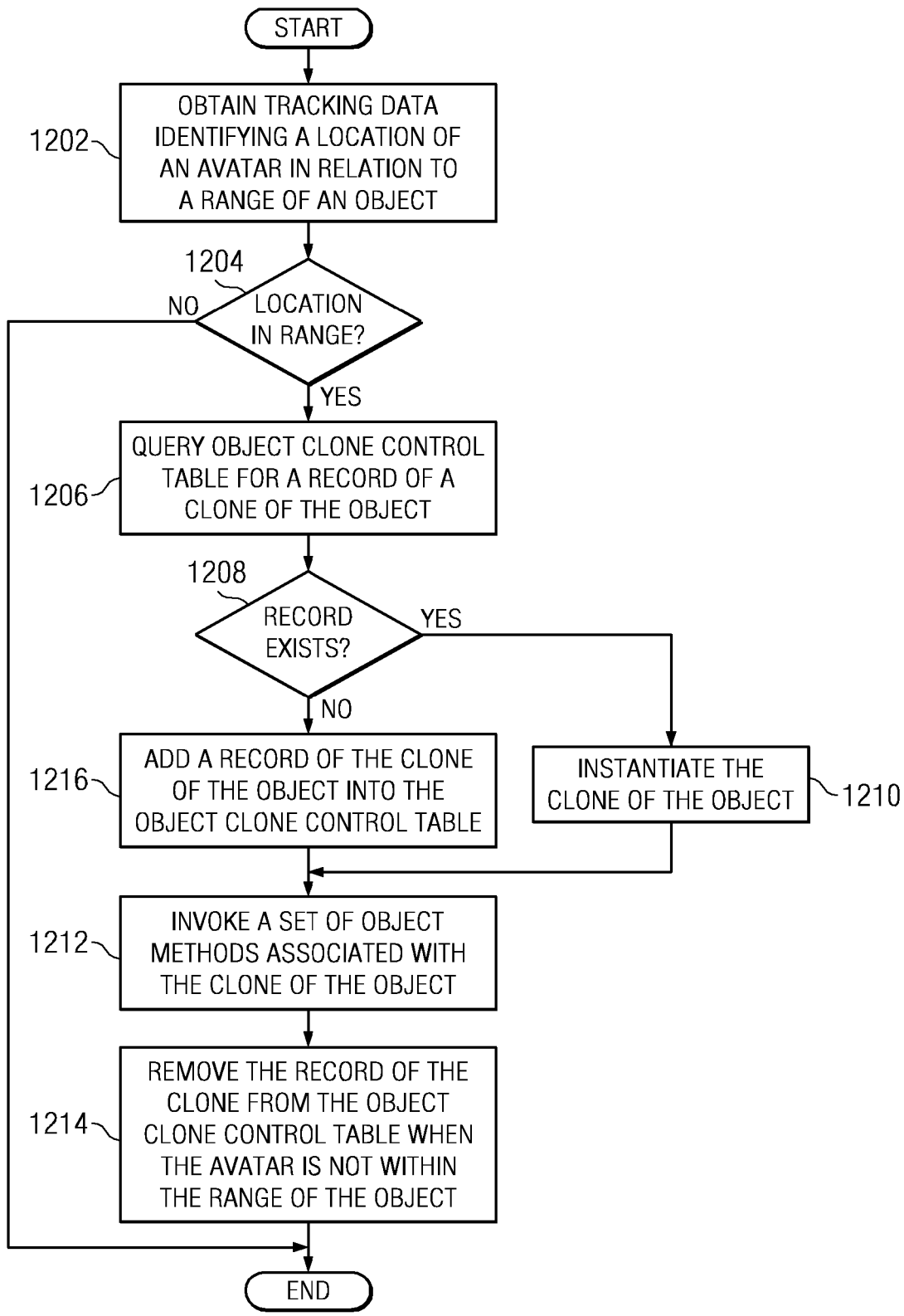
FIG. 12 is a flowchart of a process for cloning objects in a virtual universe in accordance with an illustrative embodiment.

FIG. 12 is a flowchart of a process for cloning objects in a virtual universe in accordance with an illustrative embodiment. The process in FIG. 12 is implemented by software for cloning objects, such as clone controller 320 in FIG. 3.

The process begins by obtaining tracking data identifying a location of an avatar in relation to a range of an object (step 1202). In one embodiment, a clone controller may obtain the tracking data by retrieving (or "pulling") the data from a data structure, such as object avatar rendering table 306 in FIG. 3. In another embodiment, the clone controller may receive the tracking data from another software component. For example, the tracking data may be "pushed" to the clone controller from an object based avatar tracking controller such as object based avatar tracking controller 312 in FIG. 3.

The process then makes the determination as to whether the location of the avatar is in range of the object (step 1204). If the process makes the determination that the location of the avatar is not in range, then the process terminates. However, if the process makes the determination that the location of the avatar is in range of the object, then the process queries an object clone control table for a record of a clone of the object (step 1206).

The process then makes the determination as to whether the object clone control table includes the record of the clone of the object (step 1208). If the process makes the determination that the object clone control database does include a record of the clone of the object, then the process instantiates the clone of the object (step 1210).

The process then invokes a set of object methods associated with the clone of the object (step 1212). The process removes the record of the clone from the object clone control table when the location of the avatar is not within the range of the object (step 1214) and the process terminates. The removal of the record of the clone from the object clone control table may occur upon the expiration of a predetermined amount of time. The predetermined amount of time may specify that a length of time should expire after the avatar has left the range. Thus, the invention can avoid repeatedly initiating and removing the clone if the avatar is repeatedly moving in and out of range. In an alternate embodiment, the predetermined amount of time may be null. In this embodiment, the record of the clone is removed immediately after the avatar has left the range.

Returning now to step 1208, if the process makes the determination that the object clone control table does not have a record for the clone of the object, then the process adds a record of the clone of the object to the object clone control database before proceeding to step 1210.

Figure 13:
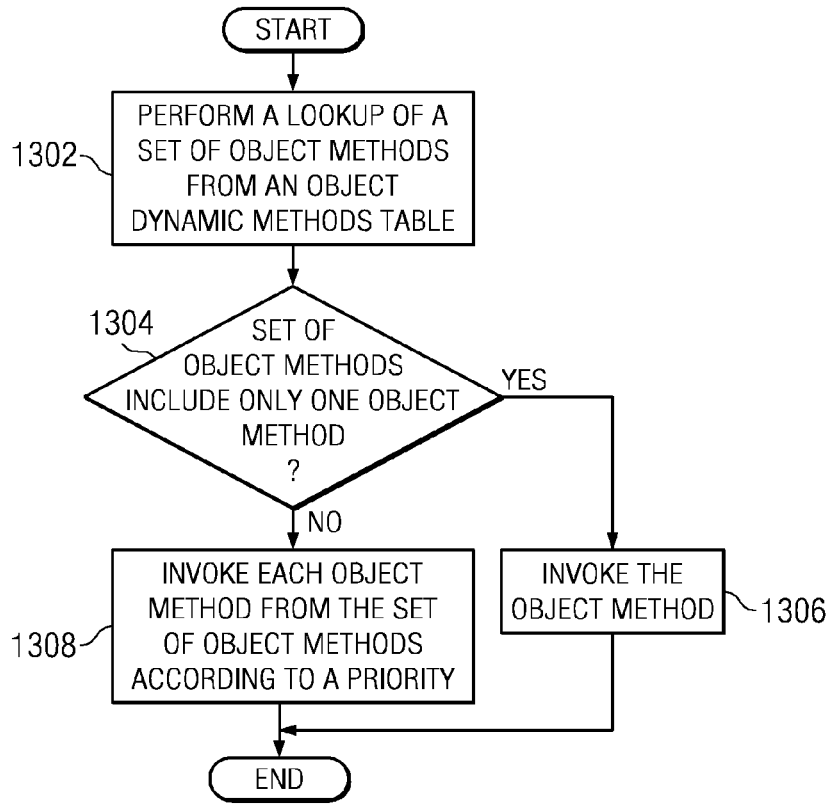
FIG. 13 is a flowchart of a process for object based avatar tracking using object avatar rendering tables in accordance with an illustrative embodiment.

FIG. 13 is a process for invoking a set of object methods in accordance with an illustrative embodiment. The process in FIG. 13 may be implemented in a software component, such as clone controller 320 in FIG. 3.

The process begins by performing a lookup of the set of object methods from an object dynamic methods table (step 1302). The set of object methods may be found by correlating an ObjectMethodUUID field from the object clone control table with the object dynamic methods table. An example of the object clone control table is object clone control table 500 in FIG. 5. An example of the object dynamic methods table is object dynamic methods table 600 in FIG. 6.

The process then makes the determination as to whether the set of object methods includes more than one method objects (step 1304). If the process makes the determination that the set of object methods includes only one object method, then the process invokes the object method (step 1306) and terminates thereafter. However, if the process makes the determination that the set of object methods includes more than one object method, then the process invokes each object method from the set of object methods according to a priority (step 1308) and the process terminates.

Figure 14:
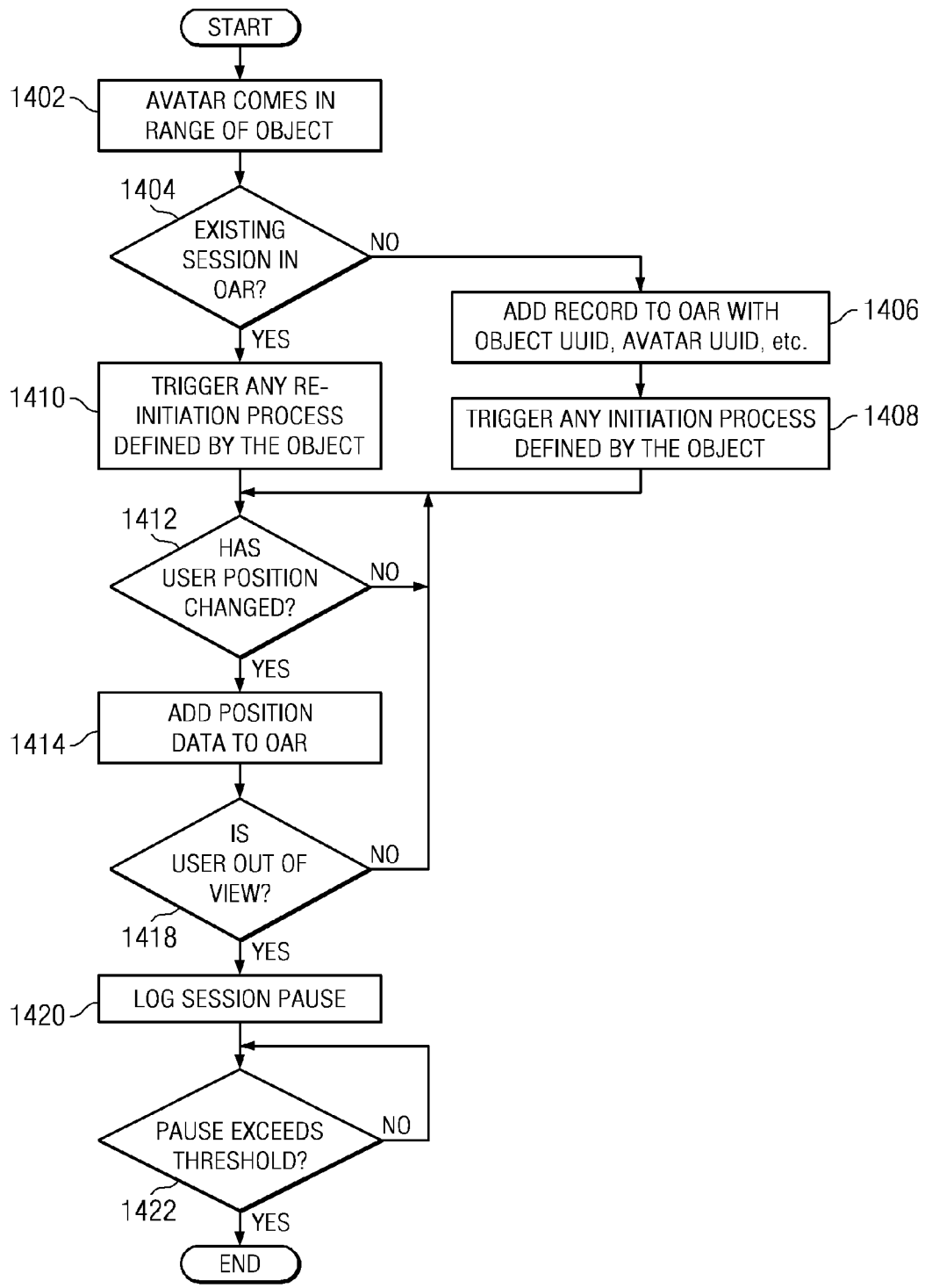
FIG. 14 is a flowchart of a process for identifying a location of an avatar in relation to a range of an object in accordance with an illustrative embodiment.

FIG. 14 is a flowchart of a process for identifying a location of an avatar in relation to a range of an object in accordance with an illustrative embodiment. The process in FIG. 14 is implemented in a software component to track avatars in a range of an object, such as object based avatar tracking controller 312 in FIG. 3.

The process begins when an avatar comes in range of the object (step 1402). A determination is made as to whether there is an existing session associated with the unique identifier of the object and the unique identifier of the avatar (step 1404). This step may be implemented by making a query to the object avatar rendering table for the object. If there is not an existing session, the process creates a record in the object avatar rendering table with the unique identifier of the object and the unique identifier of the avatar (step 1406). The record in the object avatar rendering table may include other information, such as, without limitation, a date and time, which can be used for analysis, reporting, and billing purposes.

The process triggers any object initiation process defined by the object (step 1408). For example, if a user is viewing the object for the first time and the object has a video associated with viewing the object, the process starts playing the video from the beginning.

Returning to step 1404, if a session already exists, the process triggers any object re-initiation process defined by the object (step 1410). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 1412). Changing position may include traveling, turning, or disappearing, such as teleporting, logging off, or disconnecting. If the user's position has not changed, the process returns to step 1412. The process may return to step 1412 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 1412, the process adds the user position data to the object avatar rendering table (step 1414). The user position data includes the angle of view coordinate data of the avatar relative to the object and distance of the avatar to the object. The process then performs an analysis of the position data and makes a determination as to whether the user is out of view (step 1418). The user may be out of view if the user or the user's avatar has disappeared or is no longer facing the object.

If the user is not out of view, after a specified amount of time the process returns to step 1412. The specified amount of time may be configured by the virtual universe grid administrator or object owner. The specified amount of time may be, without limitation, a specified number of seconds or a specified number of milliseconds.

If the user is out of view at step 1418, the process logs a session pause (step 1420). The log may include the date and time. Next, the process makes a determination as to whether the session has been paused for an amount of time that exceeds a threshold amount of time (step 1422). The threshold amount of time may be configured by a virtual universe administrator. If the pause does not exceed the threshold, the process returns to step 1422. When the pause exceeds the threshold, the process terminates thereafter.

The process termination may include, without limitation, removing the records of the avatar from the object avatar rendering table. If the record is not deleted, when the avatar comes back into range of the object at step 1402, the process will make a determination at step 1404 that an existing session associated with the unique identifier of the object and a unique identifier of the avatar already exist.

Thus, the illustrative embodiments provide a computer implemented method, apparatus, and computer program product for cloning objects in a virtual universe. In one embodiment, the process obtains avatar tracking data that identifies a location of an avatar in relation to a range of an object. The range includes a viewable field. In response to the location of the avatar being within the range of the object, the process queries a data structure storing cloning data for a record of a clone of the object. Thereafter, the process instantiates the clone of the object in response to the presence of the record of the clone of the object in the data structure. The process then invokes a set of object methods associated with the record of the clone in the data structure.

Rather than presenting a single object to a set of avatars having different vantage points, cloning objects enables the presentation of object clones to each avatar of the set of avatars. Further, each object clone is modified according to a set of methods that increases the visibility of that object clone to a selected avatar. Thus, the cloning of objects makes it possible to present a clone of an object to each avatar in the viewable area of the object to increase the visibility of the object. Cloning objects also increases the value of objects within a virtual universe because the visibility of these objects is improved.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for cloning objects, the method comprising:
    a computer obtaining tracking data that identifies a first location of a first avatar in relation to a range of an object, wherein the object includes a displayed advertisement, wherein the range comprises a viewable field of the object, and wherein an avatar inside of the viewable field of the object can view the object;
    the computer, responsive to the first location of the first avatar being within the viewable field of the object, querying a data structure for a record of a first clone of the object, wherein the data structure stores cloning data;
    the computer, responsive to a presence of the record of the first clone in the data structure, instantiating the first clone of the object;
    the computer invoking a set of object methods associated with the record of the first clone in the data structure, wherein the set of object methods are configured to modify a manner in which the object is displayed to the first avatar to improve a visibility of the object for the first avatar based on the first location of the first avatar;
    the computer, responsive to detecting a second avatar in a different location within the viewable field of the object, instantiating a second clone of the object, wherein the second clone includes a display of information associated with the object and displayed to the second avatar differently than a display of information displayed to the first avatar using the first clone;
    the computer removing the record of the first clone of the object from the data structure when the first avatar is outside of the range of the object for a predetermined amount of time; and
    the computer, responsive to an absence of a record of one of the first clone and the second clone from the data structure, adding an associated record for the one of the first clone and the second clone to the data structure, wherein the associated record comprises an instance unique identifier, an object unique identifier, an avatar unique identifier, and an object method unique identifier.

2. The method of claim 1 further comprising:
    the computer obtaining the tracking data from at least one of an object avatar rendering data structure and an object based avatar tracking controller.

3. The method of claim 1, wherein the computer invoking the set of object methods further comprises:
    the computer invoking the set of object methods according to a priority assigned to each object method in of the set of object methods and when the first avatar enters the viewable field of an object.

4. The method of claim 1 further comprising:
    the computer, via the set of object methods, improving the visibility of the object by at least one of enlarging the object and reducing a glare of the object.

5. The method of claim 1 further comprising:
    the computer, responsive to detecting the first avatar exiting the viewable field of the object and returning to the viewable field of the object within a predetermined amount of time, invoking the set of object methods associated with the record of the first clone in the data structure without re-instantiating the first clone of the object.

6. The method of claim 5 further comprising:
    the computer removing the record of the first clone of the object from the data structure when the first avatar is outside of the viewable field of the object for the predetermined amount of time; and
    the computer, responsive to detecting the first avatar re-entering the viewable field of the object after the predetermined amount of time and an absence of the record of the first clone in the data structure, adding a new record for a new clone of the object to the data structure and instantiating the new clone of the object.

7. A computer program product for cloning objects, the computer program product comprising:
    one or more computer-readable, tangible storage devices;
    program instructions, stored on at least one of the one or more computer-readable, tangible storage devices, to obtain tracking data that identifies a first location of a first avatar in relation to a range of an object, wherein the object includes a displayed advertisement, wherein the range comprises a viewable field of the object, and wherein an avatar inside of the viewable field of the object can view the object;
    program instructions, stored on at least one of the one or more computer-readable, tangible storage devices, responsive to the location of the first avatar being within the viewable field of the object, to query a data structure for a record of a first clone of the object, wherein the data structure stores cloning data;
    program instructions, stored on at least one of the one or more computer-readable, tangible storage devices, responsive to a presence of the record of the first clone in the data structure, to instantiate the first clone of the object;
    program instructions, stored on at least one of the one or more computer-readable, tangible storage devices, to invoke a set of object methods associated with the record of the first clone in the data structure, wherein the set of object methods are configured to modify a manner in which the object is displayed to the first avatar to improve a visibility of the object for the first avatar based on the first location of the first avatar;
    program instructions, stored on at least one of the one or more computer-readable, tangible storage devices, responsive to detecting a second avatar in a different location within the viewable field of the object, to instantiate a second clone of the object, wherein the second clone includes a display of information associated with the object and displayed to the second avatar differently than a display of information displayed to the first avatar using the first clone;
    program instructions, stored on at least one of the one or more computer-readable, tangible storage devices, to remove the record of the first clone of the object from the data structure when the first avatar is outside of the range of the object for a predetermined amount of time; and
    program instructions, stored on at least one of the one or more computer-readable, tangible storage devices, responsive to an absence of a record of one of the first clone and the second clone from the data structure, to add an associated record for the one of the first clone and the second clone to the data structure, wherein the associated record comprises an instance unique identifier, an object unique identifier, an avatar unique identifier, and an object method unique identifier.

8. The computer program product of claim 7 further comprising program instructions, stored on at least one of the one or more computer-readable, tangible storage devices, to obtain, the tracking data from at least one of an object avatar rendering data structure and an object based avatar tracking controller.

9. The computer program product of claim 7 further comprising program instructions, stored on at least one of the one or more computer-readable, tangible storage devices, to invoke the set of object methods according to a priority assigned to each of the set of object methods and when the first avatar enters the viewable field of an object.

10. The computer program product of claim 7 further comprising program instructions, stored on at least one of the one or more computer-readable, tangible storage devices, to, via the set of object methods, improve the visibility of the object by at least one of enlarging the object and reducing a glare of the object.

11. The computer program product of claim 7 further comprising program instructions, stored on at least one of the one or more computer-readable, tangible storage devices, responsive to detecting the first avatar exiting the viewable field of the object and returning to the viewable field of the object within a predetermined amount of time, to invoke the set of object methods associated with the record of the first clone in the data structure without re-instantiating the first clone of the object.

12. The computer program product of claim 11 further comprising program instructions, stored on at least one of the one or more computer-readable, tangible storage devices, to remove the record of the first clone of the object from the data structure when the first avatar is outside of the viewable field of the object for the predetermined amount of time; and program instructions, stored on at least one of the one or more computer-readable, tangible storage devices, responsive to detecting the first avatar re-entering the viewable field of the object after the predetermined amount of time and an absence of the record of the first clone in the data structure, to add a new record for a new clone of the object to the data structure and to instantiate the new clone of the object.

13. A computer system for cloning objects, the computer system comprising:
one or more processors, one or more computer-readable memories and one or more computer-readable, tangible storage devices;
program instructions, stored on at least one of the one or more computer-readable, tangible storage devices for execution by at least one of the one or more processors via at least one of the one or more computer-readable memories, to obtain tracking data that identifies a first location of a first avatar in relation to a range of an object, wherein the object includes a displayed advertisement, wherein the range comprises a viewable field of the object, and wherein an avatar inside of the viewable field of the object can view the object;
program instructions, stored on at least one of the one or more computer-readable, tangible storage devices for execution by at least one of the one or more processors via at least one of the one or more computer-readable memories, responsive to the first location of the first avatar being within the viewable field of the object, to query a data structure for a record of a first clone of the object, wherein the data structure stores cloning data;
program instructions, stored on at least one of the one or more computer-readable, tangible storage devices for execution by at least one of the one or more processors via at least one of the one or more computer-readable memories, responsive to a presence of the record of the first clone in the data structure, to instantiate the first clone of the object;
program instructions, stored on at least one of the one or more computer-readable, tangible storage devices for execution by at least one of the one or more processors via at least one of the one or more computer-readable memories, to invoke a set of object methods associated with the record of the first clone in the data structure, wherein the set of object methods are configured to modify a manner in which the object is displayed to the first avatar to improve a visibility of the object for the first avatar based on the first location of the first avatar;
program instructions, stored on at least one of the one or more computer-readable, tangible storage devices for execution by at least one of the one or more processors via at least one of the one or more computer-readable memories, responsive to detecting a second avatar in a different location within the viewable field of the object, to instantiate a second clone of the object, wherein the second clone includes a display of information associated with the object and displayed to the second avatar differently than a display of information displayed to the first avatar using the first clone;
program instructions, stored on at least one of the one or more computer-readable, tangible storage devices for execution by at least one of the one or more processors via at least one of the one or more computer-readable memories, to remove the record of the first clone of the object from the data structure when the first avatar is outside of the viewable field of the object for a predetermined amount of time; and
program instructions, stored on at least one of the one or more computer-readable, tangible storage devices for execution by at least one of the one or more processors via at least one of the one or more computer-readable memories, responsive to an absence of a record of one of the first clone and the second clone from the data structure, to add an associated record for the one of the first clone and the second clone to the data structure, wherein the associated record comprises an instance unique identifier, an object unique identifier, an avatar unique identifier, and an object method unique identifier.

14. The computer system of claim 13 further comprising:
program instructions, stored on at least one of the one or more computer-readable, tangible storage devices for execution by at least one of the one or more processors via at least one of the one or more computer-readable memories, to, via the set of object methods, improve the visibility of the object by at least one of enlarging the object and reducing a glare of the object.

15. The computer system of claim 13 further comprising:
program instructions, stored on at least one of the one or more computer-readable, tangible storage devices for execution by at least one of the one or more processors via at least one of the one or more computer-readable memories, responsive to detecting the first avatar exiting the viewable field of the object and returning to the viewable field of the object within the predetermined amount of time, to invoke the set of object methods associated with the record of the first clone in the data structure without re-instantiating the first clone of the object.

16. The computer system of claim 15, further comprising:
program instructions, stored on at least one of the one or more computer-readable, tangible storage devices for execution by at least one of the one or more processors via at least one of the one or more computer-readable memories, responsive to detecting the first avatar re-entering the viewable field of the object after the predetermined amount of time and an absence of the record of the first clone in the data structure, to add a new record for a new clone of the object to the data structure and to instantiate the new clone of the object.

* * * * *